Sept. 14, 1943.　　　R. BRENNING　　　2,329,387
SHEET-MATERIAL SHEARING TOOL
Filed July 16, 1943　　　2 Sheets-Sheet 2
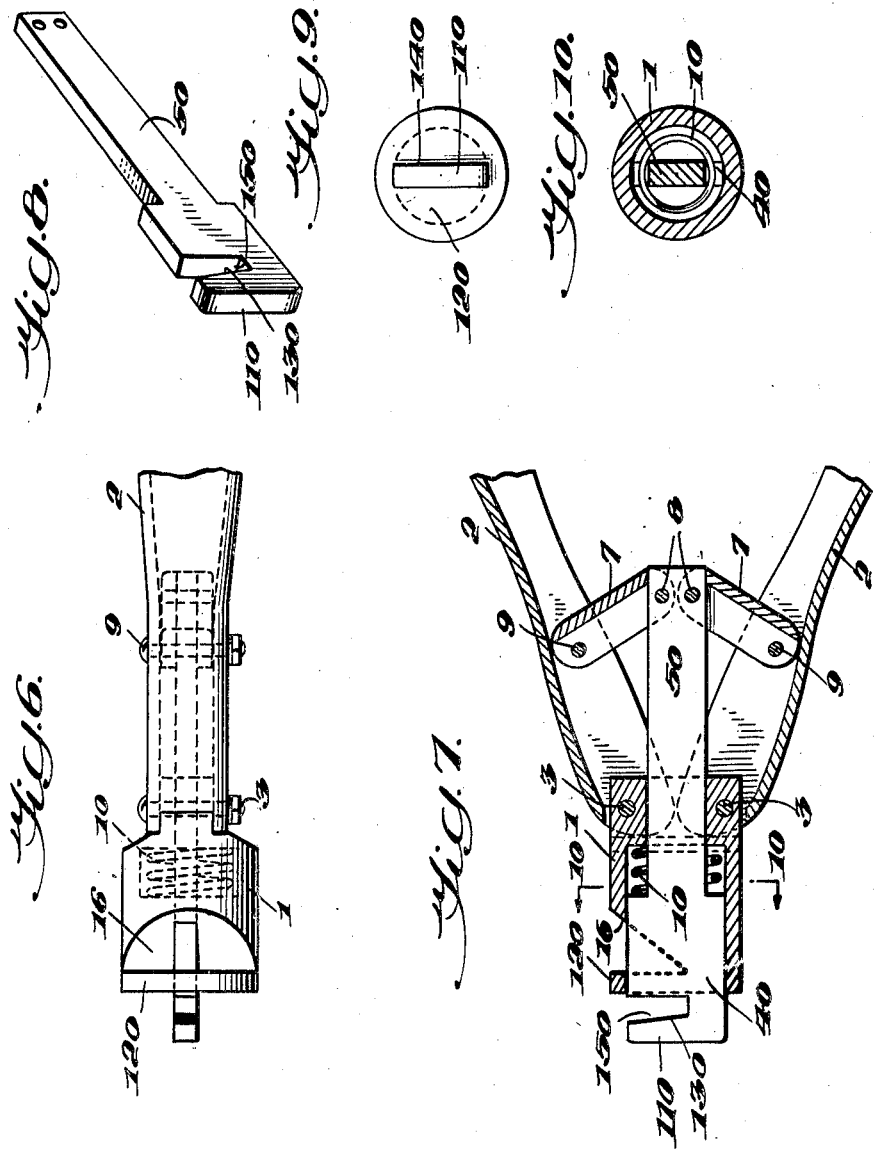
Inventor
REUBEN BRENNING,
By Babcock + Babcock
Attorneys Patented Sept. 14, 1943

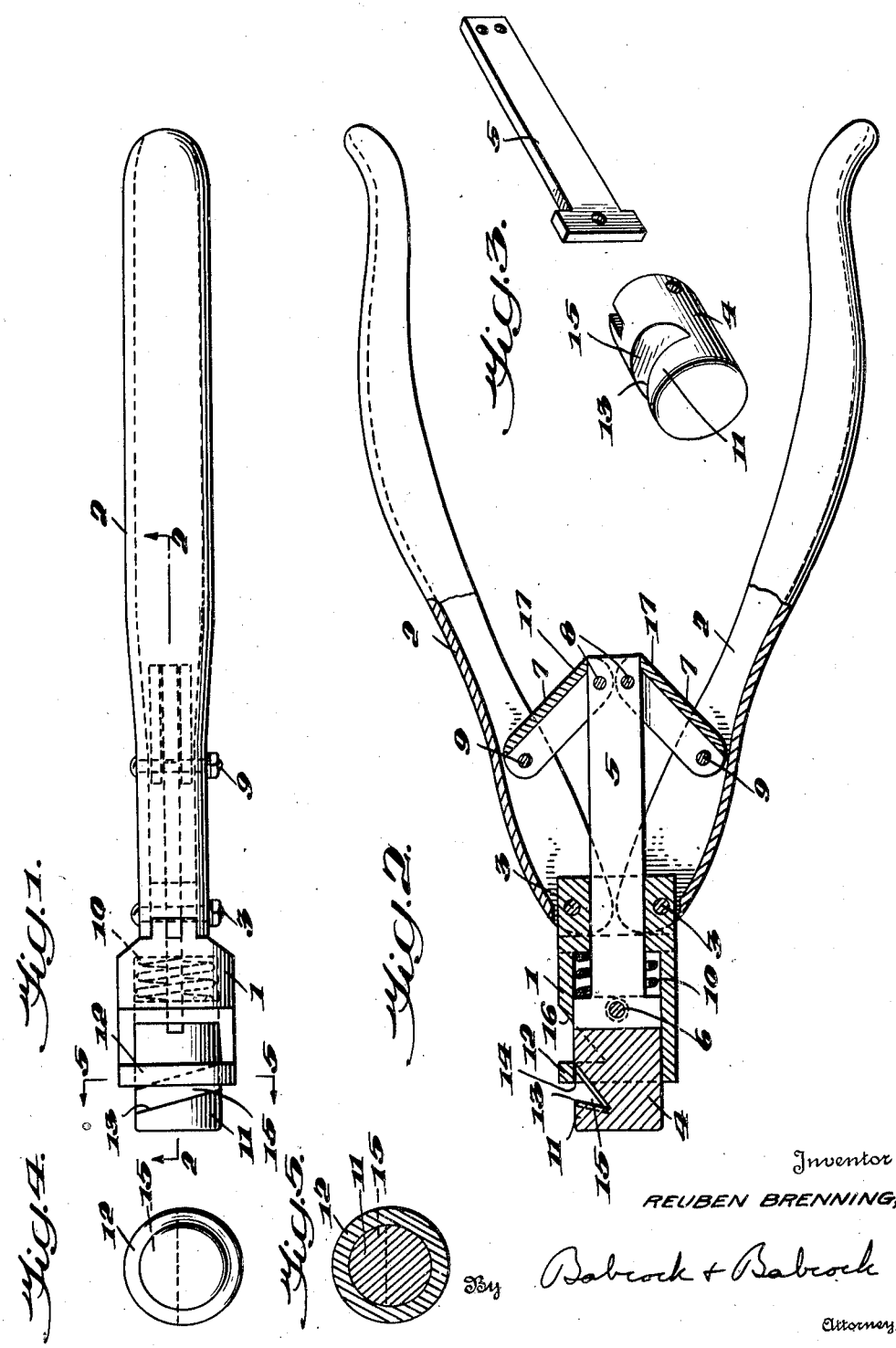

2,329,387

UNITED STATES PATENT OFFICE 2,329,387

SHEET-MATERIAL SHEARING TOOL

Reuben Brenning, Cheyenne, Wyo.

Application July 16, 1943, Serial No. 495,054

5 Claims. (Cl. 30—229)

My invention relates to a sheet material shearing or trimming tool and, to particularize in more detail, may be said to be a one-hand plier-type tool primarily intended for use in shearing or trimming sheet metal, for instance for enlarging or changing the form of punched or otherwise formed holes and for trimming or cutting away or off portions or particles that otherwise would require the use of a file or some abrading means.

The primary objects of my invention are: to provide a one-hand plier-type tool suitable for use in enlarging holes and otherwise for trimming sheet material, particularly sheet metal; to provide in such a tool a sturdy construction for maintaining all parts in proper relation; to provide in such a tool lever actuated means for moving a shearing or trimming element to cut or trim away the sheet material under a powerful pull or thrust; to provide in such a tool a construction whereby any one of several forms of cutting, shearing, or trimming elements may be used interchangeably; and to provide in a sheet material cutting or trimming hand tool a simple lever arrangement for exerting tremendous leverage upon the cutting or shearing element to force it through the sheet material by the exertion of the muscles of one hand during the cutting, shearing or trimming operation.

In the accompanying drawings:

Figure 1 represents a top plan view of a one-hand plier-type sheet metal shearing or trimming tool embodying the preferred form of my invention;

Figure 2, a view of said tool partly in side elevation and partly in section on the line 2—2 of Fig. 1, looking in the direction of the arrows;

Figure 3, an "exploded view" of the plunger cutter element and its actuating or tension or pull bar;

Figure 4, a front elevation of the head or barrel of the tool with the plunger cutter element in its associated assembled position therein;

Figure 5, a sectional view on the line 5—5 of Fig. 1, looking in the direction of the arrows;

Figure 6, a fragmentary view similar to Fig. 1, showing the tool equipped with a different, but interchangeable, head or barrel and associated cutter for cutting straight slots in sheet material;

Figure 7, a fragmentary view, similar to the sectional part shown in Fig. 2, on the line 7—7 of Fig. 6, looking in the direction of the arrows;

Figure 8, a perspective view of the plunger cutting element used in Figures 6 and 7;

Figure 9, a front elevation similar to Fig. 4, of the head or barrel of the tool when used for cutting a straight slot; and Figure 10, a sectional view on the line 10—10 of Fig. 7, looking in the direction of the arrows.

Referring now in detail to the drawings, 1 designates a preferably cylindrical form preferably cylindrically bored preferably forged steel head or barrel preferably having a reduced or flattened preferably bifurcated or slotted rearward extension preferably having parallel external side faces and to which are connected pivotally the operative handles 2 by means of suitable connecting means, such as screws 3 passing through the respective sides of the respective channeled forward end portions of the respective handles 2 which straddle the intervening upper and lower portions respectively of the furcations of said rearward extension.

A preferably cylindrical cutter or shearing or trimming plunger or element 4 of such cross-sectional size as to make a snug sliding fit within the preferably cylindrical chamber in said head or barrel 1 is slidably disposed therein with a preferably flat relatively thick or bar form metal pull rod or tongue extending slidably through a slot in the rear wall of said head or barrel 1 and between the furcations of said rearward extension. The said pull or draw bar 5 may be formed separate from the plunger or cutter element 4 with its forward end fitted into a slot in the rear of said plunger 4 and connected thereto by a rivet or pin 6.

A pair of channeled or U-shaped in cross-section preferably heavy gauge sheet metal connecting links 7 pivotally connected to the respective handles 2 by means of preferably removable and replaceable means such as screws or bolts 9 with cooperating nuts or the like, such screws or bolts passing through the side webs of the respective handles 2 and the side webs of the intervening front end portions of the respective connecting links 7, which receive between their side webs of their respective rear end portions the rear end portion of the pull or thrust bar or rod 5 with a snug swinging fit, pivotal connecting means, such as screws or bolts or other removable and replaceable pivotal connecting means 8 passing through the side webs of the respective links and the intervening rear portion of said pull or thrust rod or bar 5 serving to positively pivotally connect the respective rear end portions of said links 7 to the rear end portion of said pull or thrust bar or rod 5. Preferably the rear end portion of the bridges of the respective preferably channel-form links 7 are mitered or so cut or beveled that when said links 7 are in their extreme spread position, see Fig. 2, said mitered or beveled end portions of the bridges of the respective links 7 will make flat, preferably full area, contact with the opposed edge face portions of the rear portion of said pull or thrust rod or bar 4 and will lock the parts of the tool against further relative movement in that direction.

A preferably helical preferably wire compression spring 10 located in the cylindrical chamber of the head or barrel 1 between the inner or closed end of said cylindrical bore and the rear face of the plunger or cutting element 4 and disposed about the forward end portion of the pull or thrust rod or bar 5 normally acts or tends to act to force or thrust the plunger or cutting element 4 toward open position, so that when the handles or levers 2 shall have been swung about their respective pivots 3 toward each other, as by the closing of the hand of the operator, with resultant endwise rearward movement of the pull or thrust bar or rod 5 and corresponding endwise movement of the plunger or cutting element 4, on the opening of the hand with resultant release for opening swinging movement of the handles or levers 2, the then heavily compressed spring 10 in spreading will force the plunger 4 with its pull or thrust bar 5 in the reverse direction, pulling upon the rear end portions of the links 7 and forcing their forward ends, and the handles 2 to spread, whereupon the tool is ready to be operated again to again operatively shear, cut or trim sheet material.

The extreme forward end portion of the plunger 4 is so formed, as by the interposition of a peripheral, preferably axially slanting curvilinear notch or recess 15 with a nearly radial wall which may incline slightly to the rearward and with a forwardly and radially inwardly gently inclined wall, as to define a segmental end cutter portion 11 of which the cylindrical face is intersected by the undercut or slightly rearwardly inclined substantially radial wall of the notch or groove or recess 15 to form a sharp cutting edge 13 that has a shearing cutting action in cooperation with the cutting edge 14 of the corresponding segment 12 of the head or barrel 1, said segment of the head or barrel 1 being correspondingly cut away or notched at 16 to the rear of the strap or cutting portion 12 so that trimmings and other scrap as cut away may drop down in the groove or recess 15, pass inside of the head or barrel 1 and then escape or be discharged through the opening or notch 16. In use it is intended that the plunger 4 will have its forward end inserted through a perforation in the sheet metal, the wall of such perforation being received in part in the notch or recess 15 and the handles 2 will then be squeezed together, causing the plunger 4 to move into the barrel 1 and shearing between the cutting edges 13 and 14 such of the adjacent metal of the interposed sheet metal adjacent said perforation as is disposed in said notch 15 or extends radially inward beyond the edge 14.

In the construction or embodiment illustrated in Figures 6 to 10 inclusive, the construction and operation are the same in all respects as in the embodiment illustrated in Figures 1 to 5 inclusive, except that the head or barrel 1 has its front closed by a front plate 120 of disc form preferably welded in position thereon and formed with a narrow vertical or diametrical slot to slidably receive and guide the forward end of the plunger or cutter element 40 which preferably has parallel external side faces making a snug sliding fit between the side faces of said slot and which preferably has the thrust or pull bar 50 integral therewith, the forward side edges and one peripheral edge of said slot being formed at sharp right angles or even slightly flaring from front to rear to constitute sharp cutting edges 140 to cooperate with the forwardly and upwardly slightly inclined cutting edges 130 of the end cutter lug 110 of the cutter plunger 40, which edges 130 are separated by the notch 150 from the adjacent part of the cutter plunger 40.

The head or barrel 1 of Figures 6 to 10 inclusive with its associated cutter plunger 40 and front plate 120 and pull or thrust bar 50 may be used with one pair of handles 2, links 7 and associated parts interchangeably with the head 1 and plunger cutter 4 and associated parts of Figures 1 to 5 inclusive or, if preferred, the two may be made up as to complete independent tools in which case any means serving to suitably pivotally connect the handles to the head or barrel 1, the outer end portions of the links 7 to the handles 2, and the rear end portion of the pull or thrust bar 5 or 50 to the inner rear end portions of the links 7, may be employed.

I claim:

1. A one-hand plier-type sheet metal shearing or trimming tool comprising a cylindrical barrel having a cylindrical bore and formed with a wall extending transversely of said bore, and a cylindrical cutter plunger making a snug sliding fit in the cylindrical bore of said barrel, in combination with a pull or thrust bar connected with and extending rearwardly from the rear end of said plunger, a helical compression spring disposed about said bar between said wall and the adjacent end face of said plunger, and a pair of substantially rigid lever links respectively pivotally connected by their remote forward end portions to said handles respectively and by their adjacent rear end portions to the rear end portion of said bar whereby movement of said handles toward each other will retract the plunger into the barrel and the spreading of said handles releases the spring to press said plunger forward out of said barrel, the said plunger being notched in its cylindrical face adjacent its forward end with the forward wall of said notch intersecting the cylindrical face of said plunger at such an angle as to form a sharp cutting edge and the wall of said bore and the front face of said barrel intersecting each other at such an angle as to form a sharp cutting edge to cooperate with the cutting edge of said plunger, and said barrel being formed with an opening for the escape from its interior of scrap material.

2. A one-hand plier-type sheet metal shearing or trimming tool comprising a cylindrical barrel having a cylindrical bore and formed with a wall extending transversely of said bore, and a cylindrical cutter plunger making a snug sliding fit in the cylindrical bore of said barrel, in combination with a pull or thrust bar connected with and extending rearwardly from the rear end of said plunger, a helical spring disposed about said bar between said wall and the adjacent end face of said plunger, and a pair of substantially rigid lever links respectively pivotally connected to said handles respectively and to the rear end portion of said bar, whereby movement of said handles toward each other will retract the plunger into the barrel and the spreading of said handles releases the spring to press said plunger forward out of said barrel, the said plunger being notched in its cylindrical surface adjacent its forward end with the forward wall of said notch intersecting the cylindrical face of said plunger at such an angle as to form a sharp cutting edge and the wall of said bore and the front face of said barrel intersecting each other at such an angle as to form a sharp cutting edge to cooperate with the cutting edge of said plunger, and said barrel being formed with a discharge opening to the rear of its front face for the escape of waste material from the interior of said barrel.

3. A one-hand plier-type sheet metal shearing or trimming tool comprising a barrel having a chamber and formed with a wall extending transversely of said chamber, and a cutter plunger making a snug sliding fit in said chamber, in combination with a bar connected with and extending rearwardly from the rear end of said plunger, a helical compression spring disposed about said bar between said wall and the adjacent end face of said plunger in said chamber, and a pair of lever links respectively pivotally connected to said handles respectively and to said bar, the said plunger being notched with a wall of said notch intersecting the face of said plunger at such an angle as to form a sharp cutting edge and the wall of said chamber and the front face of said barrel intersecting each other at such an angle as to form a sharp cutting edge to cooperate with the cutting edge of said plunger, and said barrel being formed with an opening leading from said chamber for the escape therefrom of scrap material.

4. A one-hand plier-type sheet metal shearing or trimming tool comprising a barrel having a chamber formed with a circular forward end and having a wall extending transversely of said chamber, and a cutter plunger having a cylindrical portion making a snug sliding fit in said circular forward end of said chamber, in combination with a bar connected with and extending rearwardly from the rear end of said plunger, a spring disposed in said chamber and bearing against a portion of said barrel and a portion of said plunger and tending to force the latter back to its initial position, and a pair of lever links respectively pivotally connected to said handles respectively and to said bar, the said plunger having its cylindrical portion notched in such manner as to form a curvilinear sharp cutting edge and a recess next adjacent said edge to receive material to be severed from a sheet, and the wall of said circular forward end of said chamber and the front face of said barrel intersecting each other at such an angle as to form a sharp cutting edge to cooperate with the cutting edge of said plunger, and said barrel being formed with an opening leading from said chamber.

5. A one-hand plier-type sheet metal shearing or trimming tool comprising a barrel, and a cutter plunger making a snug sliding fit in said barrel, in combination with a bar connected with and extending rearwardly from the rear end of said plunger, a spring engaging said barrel and said plunger and tending to force the plunger to its initial position, and a pair of lever links respectively pivotally connected to said handles respectively and to said bar, the said plunger having parallel sides and being notches in its forward end portion to provide an axially spaced cutter finger having straight parallel cutting edges extending transversely and slightly axially with an end edge connecting said parallel cutting edges, and the front end of said barrel being formed with a slot through which said plunger slides, the said slot being formed with sharp cutting edges at its forward end cooperating with said cutting edges of said cutter finger of said plunger to cut sheet material interposed between said cutter finger and the adjacent front face of said barrel.

REUBEN BRENNING.